US009392588B2

(12) United States Patent
Zhang et al.

(10) Patent No.: US 9,392,588 B2
(45) Date of Patent: *Jul. 12, 2016

(54) METHOD AND APPARATUS FOR UPLINK ACK/NACK RESOURCE ALLOCATION

(71) Applicant: QUALCOMM Incorporated, San Diego, CA (US)

(72) Inventors: Xiaoxia Zhang, San Diego, CA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,755

(22) Filed: Nov. 30, 2015

(65) Prior Publication Data

US 2016/0081072 A1 Mar. 17, 2016

Related U.S. Application Data

(63) Continuation of application No. 12/433,678, filed on Apr. 30, 2009.

(60) Provisional application No. 61/049,827, filed on May 2, 2008.

(51) Int. Cl.
*H04W 72/04* (2009.01)
*H04W 74/00* (2009.01)
(Continued)

(52) U.S. Cl.
CPC ......... *H04W 72/0406* (2013.01); *H04L 1/1614* (2013.01); *H04L 1/1628* (2013.01);
(Continued)

(58) Field of Classification Search
CPC ............ H04W 28/04; H04W 72/0406; H04W 72/042; H04W 72/0446; H04W 72/0453; H04L 1/1614; H04L 1/1628; H04L 5/0042; H04L 5/0023
USPC ................ 370/329, 330, 335–337, 341, 431; 455/450–454
See application file for complete search history.

(56) References Cited

U.S. PATENT DOCUMENTS

2006/0195767 A1 8/2006 Ihm et al.
2008/0232307 A1 9/2008 Pi et al.
(Continued)

FOREIGN PATENT DOCUMENTS

CN 1754328 A 3/2006
CN 1768547 A 5/2006
(Continued)

OTHER PUBLICATIONS

3GPP: "InterDigital Communications, LLC", ACK/NACK Index Mapping for Uplink Transmission for E-UTRA, R1-074385, Oct. 2, 2007, pp. 1-8.
(Continued)

*Primary Examiner* — Un C Cho
*Assistant Examiner* — Jeremy Costin
(74) *Attorney, Agent, or Firm* — Anthony R. Morris

(57) ABSTRACT

A method is provided to allocate resources for wireless communications. The method includes grouping downlink control channels from multiple subframes and ordering the downlink control channels across downlink subframes having a first control channel element located in a first symbol map and associated with reserved resources for an uplink channel. The method employs a symbol first mapping or a mixed-symbol/subframe first mapping to efficiently allocate the resources.

5 Claims, 11 Drawing Sheets

DOWNLINK 140
100
120
170
130
MAPPED SYMBOLS
BASE STATION (S)
110
USER EQUIPMENT OR DEVICES
160
WIRELESS NETWORK
190
SYMBOL MAPPING COMPONENT
180
MAPPED SYMBOL DECODER
ACK/NACK RESOURCES
UPLINK 150

(51) Int. Cl.

| | |
|---|---|
| ***H04L 1/16*** | (2006.01) |
| ***H04L 5/00*** | (2006.01) |
| ***H04L 1/18*** | (2006.01) |
| ***H04L 5/14*** | (2006.01) |
| *H04W 28/06* | (2009.01) |
| *H04W 28/26* | (2009.01) |
| *H04W 72/00* | (2009.01) |

(52) U.S. Cl.

CPC ............ *H04L1/1887* (2013.01); *H04L 5/0007* (2013.01); *H04L 5/0023* (2013.01); *H04L 5/0042* (2013.01); *H04L 5/0053* (2013.01); *H04L 5/0055* (2013.01); *H04L 5/0092* (2013.01); *H04L 5/14* (2013.01); *H04L 5/1469* (2013.01); *H04W 74/004* (2013.01); *H04W 28/06* (2013.01); *H04W 28/26* (2013.01); *H04W 72/00* (2013.01); *H04W 72/042* (2013.01)

(56) References Cited

U.S. PATENT DOCUMENTS

| | | | |
|---|---|---|---|
| 2009/0006925 | A1 | 1/2009 | Pan |
| 2009/0073958 | A1 | 3/2009 | Xu |
| 2009/0274109 | A1 | 11/2009 | Zhang et al. |
| 2010/0098020 | A1 | 4/2010 | Kim et al. |

FOREIGN PATENT DOCUMENTS

| | | | |
|---|---|---|---|
| CN | 101127584 | A | 2/2008 |
| WO | WO-2008038112 | A2 | 4/2008 |
| WO | WO-2008137430 | A1 | 11/2008 |
| WO | WO-2009037853 | A1 | 3/2009 |
| WO | WO-2009116754 | A2 | 9/2009 |

OTHER PUBLICATIONS

3GPP TSG RAN WG1 Meeting 50bis, UL RB mapping and slot-level re-mapping for ACK/NACK and CQI, Shanghai, China, Oct. 8-12, 2007,pp. 1-3, R1-074096.

Huawei: "ACK/NACK repetition in E-UTRA uplink" 3GPP Draft; R1-080121, 3rd Generation Partnership Project (3GPP), Mobile Competence Centre ; 650, Route Des Lucioles ; F-06921 Sophia-Antipolis Cedex; France, vol. RAN WG1, No. Sevilla, Spain; Jan. 8, 2008, XP050108652.

Huawei: "Relation between UL ACK/NACK and DL CCE" 3GPP Draft; R1-074063, 3rd Generation Partnership Project (3GPP), Mobile Compentence Centre ; 650, Route Des Lucioles ; F-06921 Sophia-Antipolis Cedex; France, vol. RAN WG1, No. Shanghai, China; Oct. 2, 2007, XP050107604.

International Search Report and Written Opinion—PCT/US2009/042632, International Searching Authority—European Patent Office, Mar. 29, 2010.

LG Electronics Inc: "Efficient Utilization of Unused PUCCH RB [online]", 3GPP TSG-RAN WG1#52b R1-081258, Mar. 26, 2008, URL:http://www.3gpp.org/ftp/tsg_ran/WG1_RL1/TSGR1_52b/Docs/R1-081258.zip.

LG Electronics: "Uplink ACK/NACK resource allocation in TDD", 3GPP Draft; R1-081568 UL ACKNACK in TDD.Rev, 3rd Generation Partnership Project (3GPP), Mobile Compentence Centre ; 650, Route Des Lucioles ; F-06921 Sophia-Antipolis Cedex ; France, vol. RAN WGI, No. Shenzhen, China; Apr. 9, 2008, XP050109983, [retrieved on Apr. 9, 2008].

Motorola: "UL ACK/NACK Resource Provisioning [online]", 3GPP TSG-RAN WG1#51b R1-080082, Jan. 2008, URL:http://www.3gpp.org/ftp/tsg_ran/WG1_RL1/TSGR1_51b/Docs/R1-080082.zip.

Motorola :"Uplink ACK/NACK for TDD", 3GPP Draft; R1-081292, 3GPP TSG-RAN1 #52-bis 0, Shenzhen, China, Mar. 31-Apr. 4, 2008.

Motorola: "Uplink Control Signaling for E-UTRA TDD", 3GPP TSG RAN1 LTE TDD AdHoc R1-071867, Apr. 2007, URL,http://www.3gpp.org/ftp/tsg_ran/WG1_RL1/TSGR1_AH/LTE_TDD_April-07/Docs/Ra-071867.zip.

Nokia et al: "Control channel to RE mapping" 3GPP Draft; R1-074318 Control Channel to Re Mapping, 3rd Generation Partnership Project (3GPP), Mobile Compentence Centre ; 650, Route Des Lucioles ; F-06921 Sophia-Antipolis Cedex ; France, vol. RAN WG1, No. Shanghai, China; Oct. 2, 2007, XP050107834.

Qualcomm Europe: "Mapping of resources for UL ACK in TDD" 3GPP Draft; R1-082547, 3rd Generation Partnership Project (3GPP), Mobile Compentence Centre ; 650, Route Des Lucioles ; F-06921 Sophia-Antiopolis Ceders; France, vol. RAN WG1, No. Warsaw, Poland; Jun. 25, 2008, XP050110809.

Samsung, "ACK/NAK Repetitions in E-UTRA UL", 3GPP TSG-RAN WG1#50b R1-074098, Shanghai, China, Oct. 8-12, 2007, Internet URL: http://www.3gpp.org/ftp/tsg_ran/WG1_RL1/TSGR1_50b/Docs/R1-074098.zip.

Samsung: "UL RB mapping and slot-level re-mapping for ACK/NACK and CQI", 3GPP TSG-RAN WG1#51 bis, R1-080037, Sevilla, Spain, Jan. 14-18, 2008, Internet URL: http://www.3gpp.org/ftp/tsg_ran/WG1_RL1/TSGR1_51b/Docs/R1-080037.zip.

Samsung: "UL RB mapping and slot-level re-mapping for ACK/NACK and CQI", R1-074785, 3GPP TSG RAN WG1 Meeting #51, Nov. 5-9, 2007.

Taiwan Search Report—TW098114749—TIPO—Nov. 2, 2012.

Taiwan Search Report—TW102119220—TIPO—Dec. 27, 2014.

Taiwan Search Report—TW102119220—TIPO—Sep. 3, 2015.

METHOD AND APPARATUS FOR UPLINK ACK/NACK RESOURCE ALLOCATION

CROSS REFERENCE TO RELATED APPLICATIONS

This application is a Continuation of U.S. Ser. No. 12/433,678, filed Apr. 30, 2009, entitled: METHOD AND APPARATUS FOR UPLINK ACK/NACK RESOURCE ALLOCATION, which claims the benefit of U.S. Provisional Ser. No. 61/049,827, entitled METHODS OF UL ACK/NACK RESOURCE ALLOCATION FOR TDD IN E-UTRAN, filed on May 2, 2008, the entirety of which are both incorporated herein by reference.

BACKGROUND

I. Field

The following description relates generally to wireless communications systems, and more particularly to efficiently allocating resources via flexible symbol mapping methods.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

One consideration in the deployment of the above systems relates to how resources are allocated during downlink communications. Resources are typically generated within the context of a resources block and generally consume multiple subcarriers. Thus, the conservation of resource block generation and transmission is a desired feature of wireless communications. One area where such resources are consumed is in the support of multiple acknowledgements (ACK) during an uplink (UL) handshake sequence, where the handshake is in response to a downlink (DL) subframe transmission. The UL transmissions can also include negative acknowledgement (NACK) as well, thus the term ACK/NACK is often employed. In a frequency division duplex (FDD) scenario, the number of resources is controlled since there is an implicit one-to-one resource mapping between UL and DL subframe transmissions. In a time division duplex (TDD) scenario however, there can be asymmetric differences between the number of DL subframes and respective UL subframes. Such asymmetries can cause an inefficient allocation of resources however if a one-one mapping is assumed.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to flexibly and efficiently map uplink acknowledgement/negative-acknowledgement (ACK/NACK) responses in a time division duplex network. Various symbol mapping methods are provided that account for asymmetric differences between downlink and uplink channel communications, where asymmetries occur when downlink subframes are greater than the number of uplink subframes. In one aspect, a symbol first mapping approach is provided. This includes ordering downlink control channels across downlink subframes having a first control channel element (CCE), located in a first symbol map, and associated with reserved resources for an uplink channel, where such resource can include resource blocks associate with ACK/NACK responses. After the first ordering, then ordering downlink control channels having a first CCE in a second OFDM symbol followed by ordering downlink control channels having a first CCE in a third OFDM symbol and so forth as necessary. In another aspect, a mixed-symbol, subframe first mapping can be applied. Similar to the symbol first mapping, the subframe first mapping includes ordering downlink control channels across downlink subframes having a first control channel element (CCE), located in a first symbol map, and associated with reserved resources for an uplink channel. The subframe first then orders remaining downlink control channels not associated with the first CCE in a first downlink subframe. This can be followed by ordering remaining downlink control channels not associated with the first CCE or the first downlink subframe in a second downlink subframe and so forth.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to efficiently allocate resources during uplink acknowledgement/negative-acknowledgement (ACK/NACK) sequences. In one aspect, a method is provided to allocate resources for wireless communications. The method includes grouping downlink control channels from multiple subframes and ordering the downlink control channels across downlink subframes having a first control channel element located in a first symbol map and associated with reserved resources for an uplink channel. The method employs a symbol first mapping or a mixed-symbol/subframe first mapping to efficiently allocate the resources.

Figure 1:
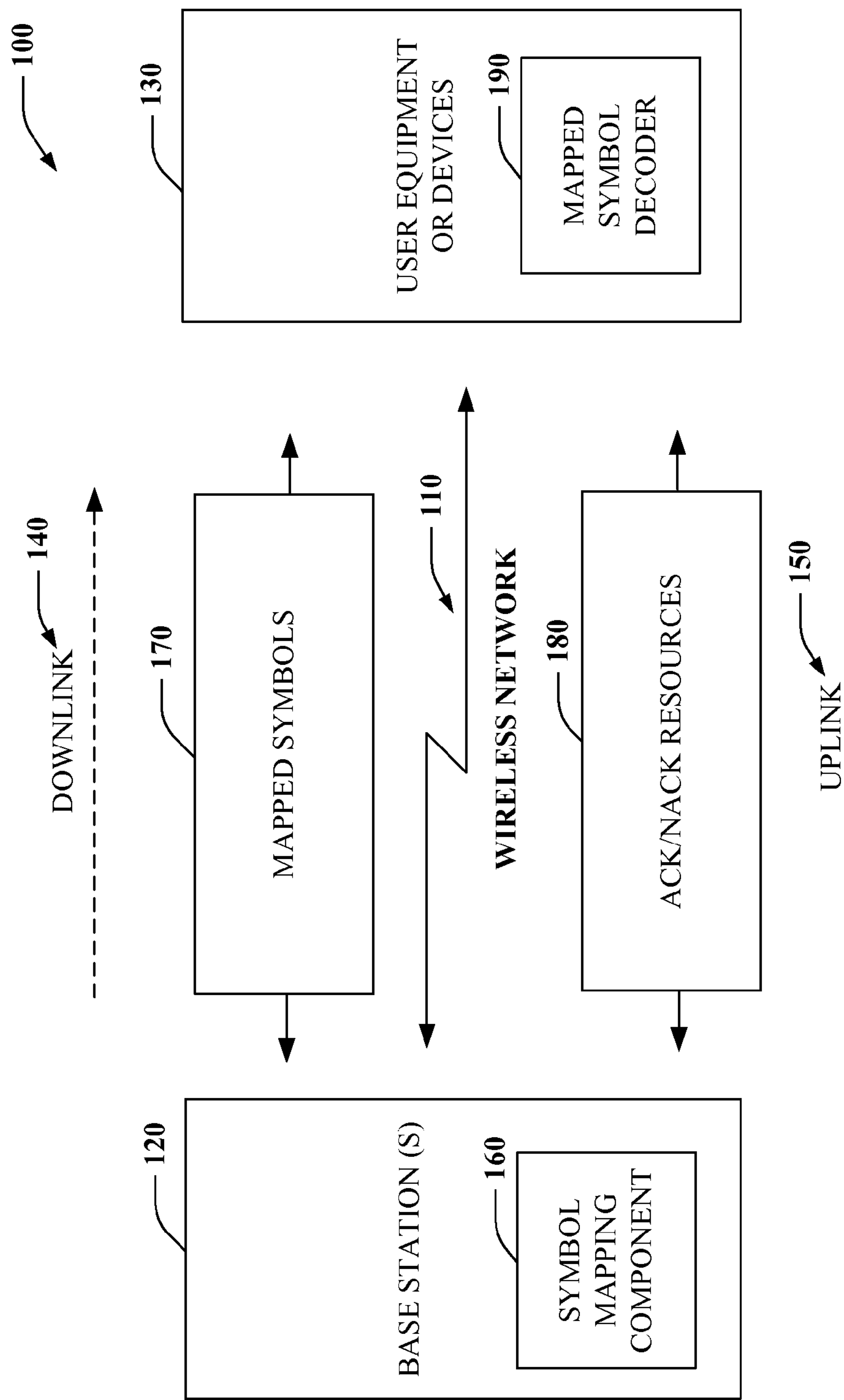
FIG. 1 is a high level block diagram of a system that employs symbol mapping components to facilitate efficient allocation of resources in a wireless communications system.

Referring now to FIG. 1, symbol mapping components are employed to facilitate efficient allocation of resources in a wireless communications system 100. The system 100 includes one or more base stations 120 (also referred to as a node, evolved node B—eNB) which can be an entity capable of communication over a wireless network 110 to a second device 130 (or devices). For instance, each device 130 can be an access terminal (also referred to as terminal, user equipment, mobility management entity (MME) or mobile device). The base station 120 communicates to the device 130 via downlink 140 (DL) and receives data via uplink 150 (UL). Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for the symbol mapping described herein. In one aspect, a symbol mapping component 160 is employed to order, sequence, or map symbols 170 and control allocation of resources such as ACK/NACK resources 180. The device 130 (or devices) includes a mapped symbol decoder 190 to process the mapped symbols 170 and resources 180. As will be described in more detail below with respect to FIGS. 2-4, the symbol mapping component 160 can include a symbol first mapping method, a mixed-symbol subframe first mapping method, or a subframe first mapping method. Before proceeding, it is noted that various acronyms are employed for brevity. The acronyms are defined at the end of the specification.

In general, UL resource allocation has to consider the number of UL and DL subframes. In one instance, consider, uplink ACK/NACK resource allocation when $n_{DL} \leq n_{UL}$, where $n_{DL}$ is number of downlink subframes and $n_{UL}$ is number of uplink subframes for a given uplink-downlink configuration. The implicit mapping of UL ACK/NACK to the first control channel element (CCE) of the DL PDCCH in TDD can be processed similarly as in FDD when $n_{DL} \leq n_{UL}$. Note that $n_{DL}$ includes the special sub-frame(s). For UL ACK/NACK resource allocation when $n_{DL} > n_{UL}$, then the asymmetric case is considered. In the asymmetric case, where the number of DL sub-frames is larger than the UL sub-frames, within one UL sub-frame, the UL ACK/NACK responds to multiple DL sub-frames. Note the DL sub-frames include the special sub-frame(s).

In general, the system 100 flexibly and efficiently maps uplink acknowledgement/negative-acknowledgement (ACK/NACK) responses in a time division duplex network (can also be applied to FDD). Various symbol mapping methods are provided that account for asymmetric differences between downlink and uplink channel communications, where asymmetries occur when downlink subframes are greater than the number of uplink subframes. In one aspect, a symbol first mapping approach is provided. This includes ordering downlink control channels across downlink subframes having a first control channel element (CCE), located in a first symbol map, and associated with reserved resources for an uplink channel, where such resource can include resource blocks associate with ACK/NACK responses. After the first ordering, then ordering downlink control channels having a first CCE in a second OFDM symbol followed by ordering downlink control channels having a first CCE in a third OFDM symbol and so forth as necessary. The symbol first mapping approach is described in more detail with respect to FIG. 2.

In another aspect, a mixed-symbol, subframe first mapping can be applied. Similar to the symbol first mapping, the subframe first mapping includes ordering downlink control channels across downlink subframes having a first control channel element (CCE), located in a first symbol map, and associated with reserved resources for an uplink channel. The subframe first then orders remaining downlink control channels not associated with the first CCE in a first downlink subframe. This can be followed by ordering remaining downlink control channels not associated with the first CCE or the first downlink subframe in a second downlink subframe and so forth. The mixed-symbol subframe first mapping is described in more detail with respect to FIG. 3. A subframe first mapping is described with respect to FIG. 4.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
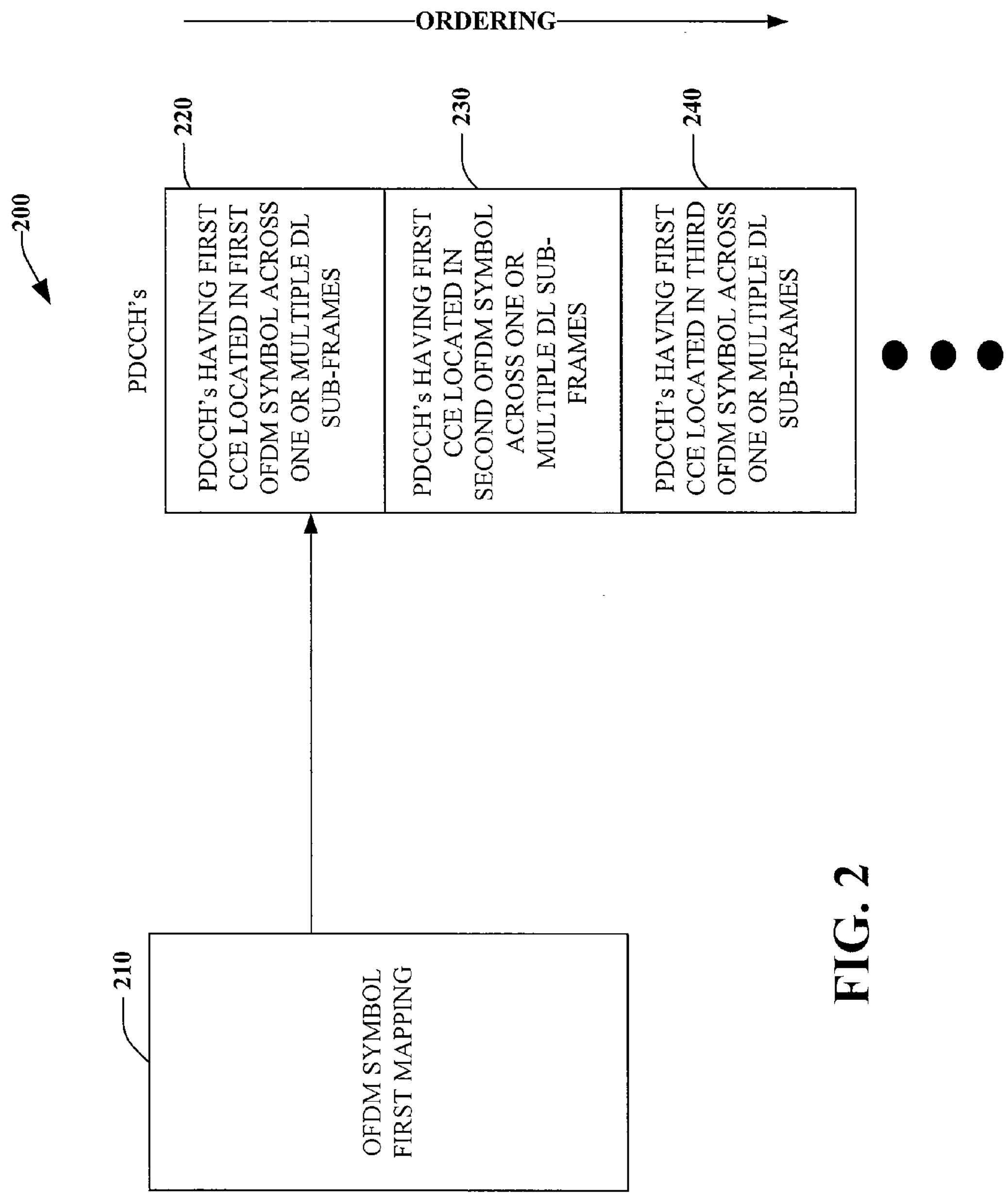
FIG. 2 is a block diagram that illustrates a symbol first mapping for efficient allocation of resources.

Turning to FIG. 2, a system 200 provides a symbol first mapping component 210 for efficient allocation of resources. In general, PDCCH's are ordered having a first control channel element (CCE) located in a first OFDM symbol at 220. This is followed by PDCCH's that are ordered as a first control channel element (CCE) located in a second OFDM symbol at 230 and PDCCH's that are ordered as a first control channel element (CCE) located in a third OFDM symbol at 240 and so forth.

A subframe first approach (See FIG. 4) may end up with unused PUCCH resources or impose strict constraints at the scheduler at the cost of inefficiently utilizing DL PDCCH resources. In order to overcome these constraints, a flexible alternative is provided and is referred to as the OFDM Symbol First Mapping and is described as follows:

Group the DL PDCCHs in multiple-subframes together. As shown in FIG. 2, Re-order the PDCCHs in a manner such that the PDCCHs across the DL subframes whose first CCE is located in the first OFDM symbol map to a band-edge of reserved resources for UL dynamic ACK/NACKs. This ordering is followed by the PDCCHs whose first CCE is located in the second OFDM symbol and the PDCCHs whose first CCE is located in the third OFDM symbol is mapped, and so forth. If some of the DL sub-frames do not use up N ACK/NACK resources (N a positive integer), with the OFDM symbol first mapping, some of the unused resources in the reserved band for ACK transmissions can be scheduled by the eNB for PUSCH transmission.

Consider an M DL:1 UL (M is a positive integer) asymmetry pattern as an example. Assume that in the first DL sub-frame, PDCCH region spans 3 OFDM symbols while the other M−1 sub-frames use 2 OFDM symbols for PDCCH transmission. Assume N ACK/NACK resources are needed to support PDCCH span for 3 OFDM symbols with roughly N/3 for the PDCCH in each OFDM symbol. The ACK resource reservation will assume 3 OFDM symbol transmission in each DL sub-frame as it is semi-static configured hence it has to cover the largest possible PDCCH time span for each configuration period.

With the sub-frame first mapping, the first DL sub-frame will take up the first N ACK/NACK resources; the second DL sub-frame cannot use up all N resources as the PDCCH span is 2 OFDM symbols instead of 3, however, the corresponding ACK resources cannot be freed up as the implicit mapping of the third DL sub-frame assumes each DL sub-frame use up all N ACK resources. For the last DL sub-frame, the corresponding unused ACK resources can be used by PUSCH transmission as no further implicit mapping is involved. With the OFDM symbol first mapping, the M DL sub-frames will take up the first N+2(M−1) N/3 ACK/NACK resources and the remaining (M−1) N/3 resources are left unused and can be used for PUSCH transmission. However, with the OFDM symbol first mapping, if the first DL sub-frame utilizes 3 OFDM symbols to transmit PDCCH while for the other DL sub-frames the PDCCH span is 1 OFDM symbol, some of the ACK resources can be wasted as in order to have the desired implicit mapping, the ACK resources corresponding to the PDCCHs whose first CCE is located in the second OFDM symbol cannot be freed up.

Figure 3:
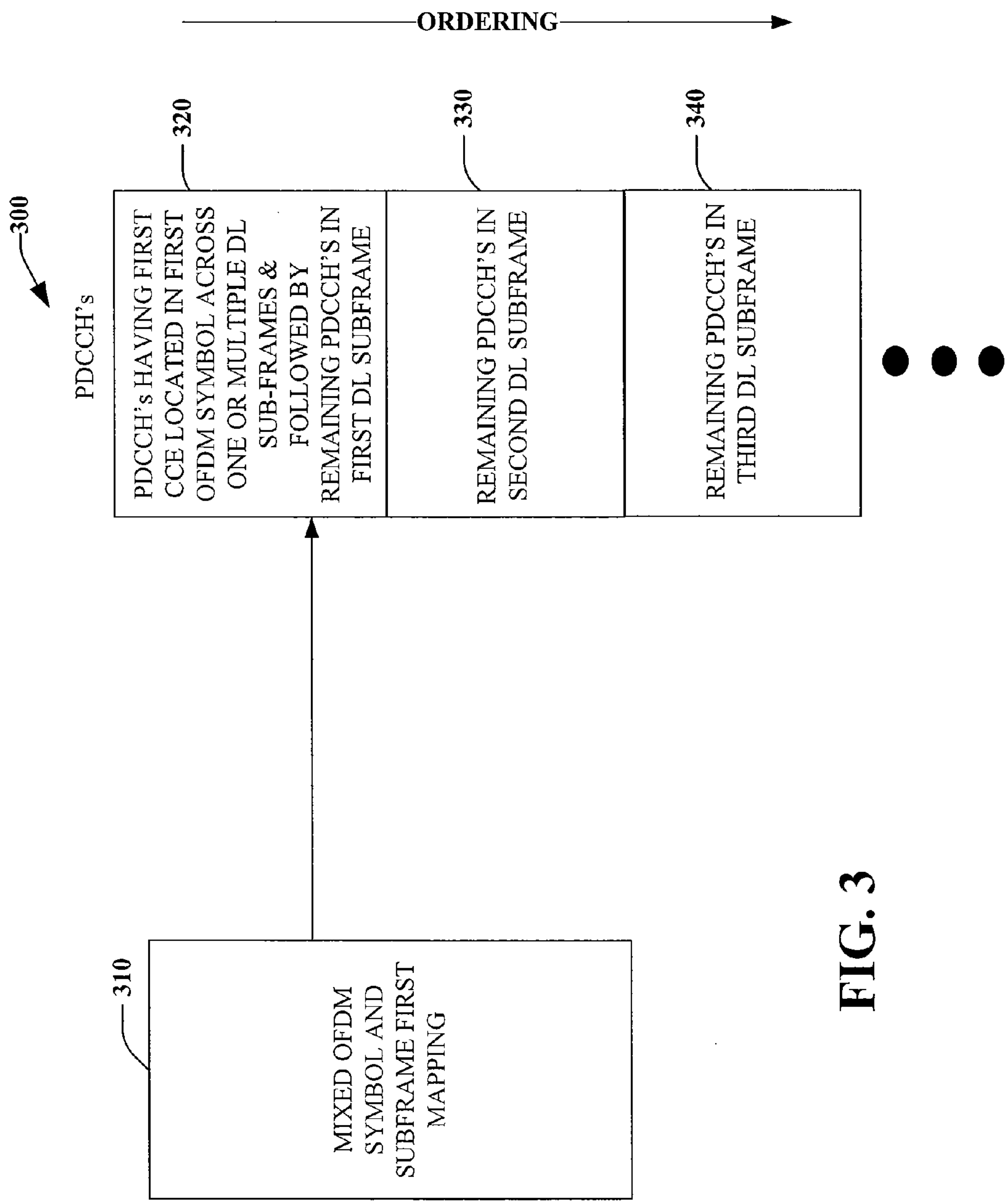
FIG. 3 is a block diagram that illustrates a mixed-symbol and subframe first mapping for efficient allocation of resources.

Referring to FIG. 3, a system 300 provides a mixed-symbol and subframe first mapping component 310 for efficient allocation of resources. Similar to the first ordering describe in FIG. 2, PDCCH's are ordered having a first control channel element (CCE) located in a first OFDM symbol at 320 which are followed by remaining PDCCH's in the first DL subframe. At 330 and 340, remaining PDCCH's are ordered in second and third DL subframes as necessary.

As mentioned above, the OFDM symbol first mapping can result in some possible ACK resource inefficiencies and in this aspect, a mixed approach is provided and denoted as "mixed OFDM symbol and sub-frame first mapping."

Initially, group the DL PDCCHs in multiple-subframes together. Similar to above, reorder these PDCCHs in a manner such that the PDCCHs across all DL sub-frames whose first CCE is located in first OFDM symbol map to the band-edge of the reserved resources for UL dynamic ACK/NACKs. This sequence can be followed by the remaining PDCCHs in the first DL sub-frame, the remaining PDCCHs in the second sub-frame and so on and shown at 330 and 340 respectively.

Consider the same M DL:1 UL asymmetry pattern as the example described above with respect to FIG. 2. Assume that in the first DL sub-frame PDCCH region spans 3 OFDM symbols, while the other M−1 sub-frames use 1 OFDM symbol for PDCCH transmission. Assume N ACK/NACK resources are needed to support PDCCH span for 3 OFDM symbols with roughly N/3 for the PDCCH in each OFDM symbol. The ACK resource reservation assumes 3 OFDM symbol transmissions in each DL sub-frame as it is semi-static configured hence it has to cover the largest possible PDCCH time span for each configuration period.

With the sub-frame first mapping, the first DL sub-frame will take up the first N ACK/NACK resources; the second DL sub-frame cannot use up the N resources as the PDCCH span is 1 OFDM symbol instead of 3, however, the corresponding ACK resources cannot be freed up as the implicit mapping of the third DL sub-frame assumes each DL sub-frame uses up N ACK resources. For the last DL sub-frame, the corresponding unused ACK resources can be used by PUSCH transmission as no further implicit mapping is involved. With the OFDM symbol first mapping, the M DL sub-frames will utilize the first N+2(M−1) N/3 ACK/NACK resources and the remaining (M−1) N/3 resources are left unused and can be used for PUSCH transmission. Note that even the M−1 subframes use 1 OFDM for PDCCH transmission instead of 2, thus the same number of ACK resources are employed. With the mixed approach, the M DL sub-frames will take up the first N+(M−1) N/3 ACK/NACK resources and the remaining 2(M−1) N/3 resources are left unused and can be used for PUSCH transmission.

Figure 4:
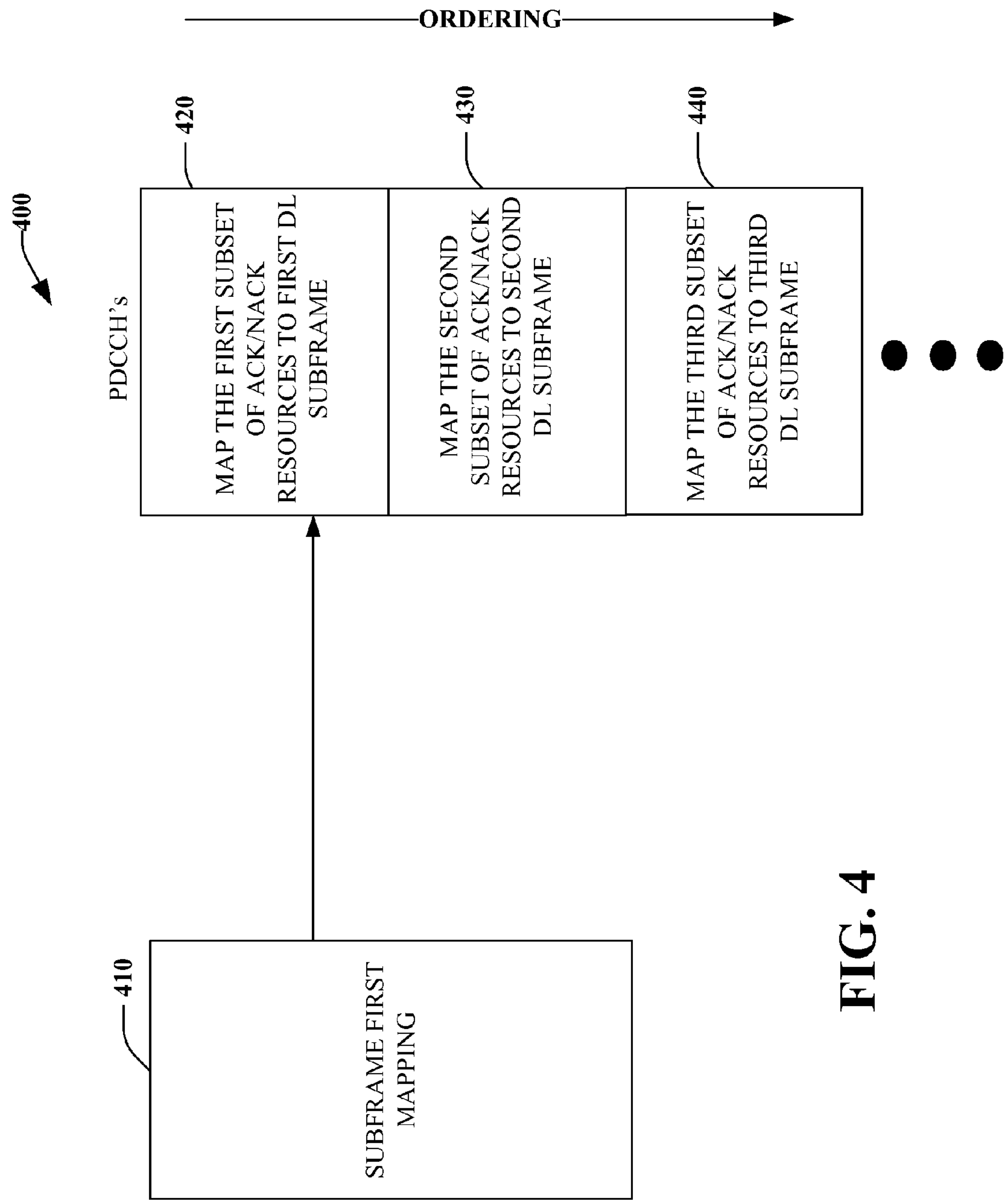
FIG. 4 is a block diagram that illustrates a subframe first mapping for efficient allocation of resources.

Referring to FIG. 4, a system 400 illustrates a subframe first mapping component 410 for allocation of resources. With the asymmetric configuration, each UL subframe will send ACK/NACK corresponding to multiple sub-frames. The subframe first mapping approach maps the DL PDCCHs one sub-frame by one sub-frame as shown at 420 through 440 respectively, i.e., the first DL sub-frame will take up the first N ACK/NACK resources, then the second DL sub-frame, and so on. Depending on the asymmetric configuration the UL ACK resource will be M times more than needed in an FDD system where M is the asymmetric number (M DL vs 1 UL).

In order to reduce the overhead, the total number of ACK resources can be configured less than the total number of DL PDCCHs across multiple DL sub-frames. However, this would imply some of the PDCCH in one DL sub-frame will collide with some other PDCCHs in another subframe, hence the schedule take the constraint into account. This would also imply the PDCCHs across different subframes may not be able to coexist hence a certain waste on the PDCCH resource is imposed. In another aspect, as the number of PDCCHs in each DL subframe is a dynamic number depending on PCFICH, the active users/buffer size in that sub-frame while the UL ACK resource reservation is semi-static. Therefore, if some of the DL sub-frames do not use up the N ACK/NACK resources, the reserved bandwidth is not utilized.

Figure 5:
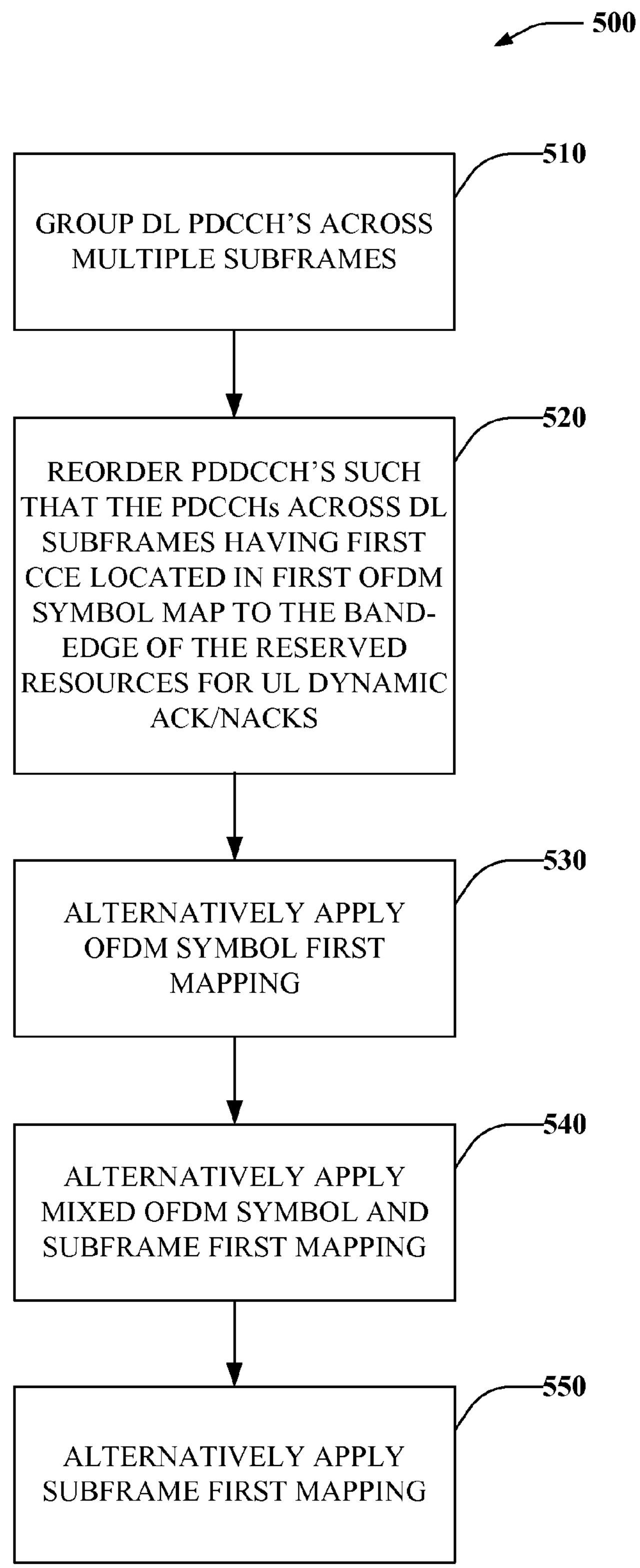
FIG. 5 illustrates a wireless communications method that employs symbol mapping to facilitate efficient allocation of resources in a wireless communications system.

Referring now to FIG. 5, a wireless communications methodology 500 is illustrated. While, for purposes of simplicity of explanation, the methodology (and other methodologies described herein) are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 510, group the downlink control channels (e.g. PDCCH's) from multiple subframes. At 520, reorder the control channels such that the control channels across subframes having a first control channel element (CCE) is located in a first OFDM symbol map to the band-edge of the reserved resources for uplink ACK/NACKs. After 520, at least three alternative processing approaches can be applied individually and/or in different combinations. At 530, a first processing approach employs an OFDM symbol first mapping as was previously described with respect to FIG. 2. At 540, an alternative processing approach utilizes a mixed OFDM symbol and subframe first mapping as was described with respect to FIG. 3. At 550, a third approach is a subframe first mapping process that can be alternatively applied.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
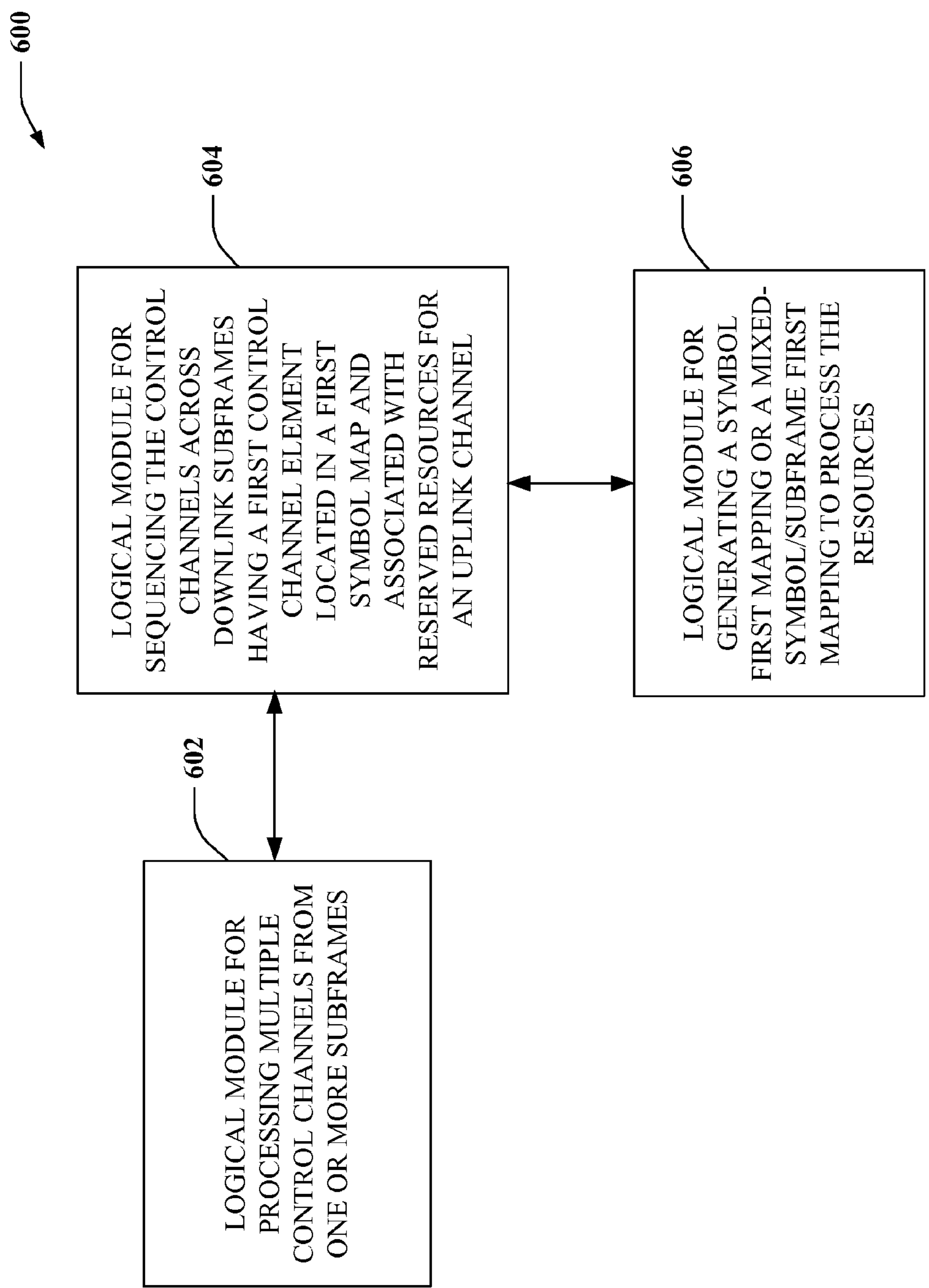
FIG. 6 illustrates an example logical module for wireless symbol mapping.
Figure 7:
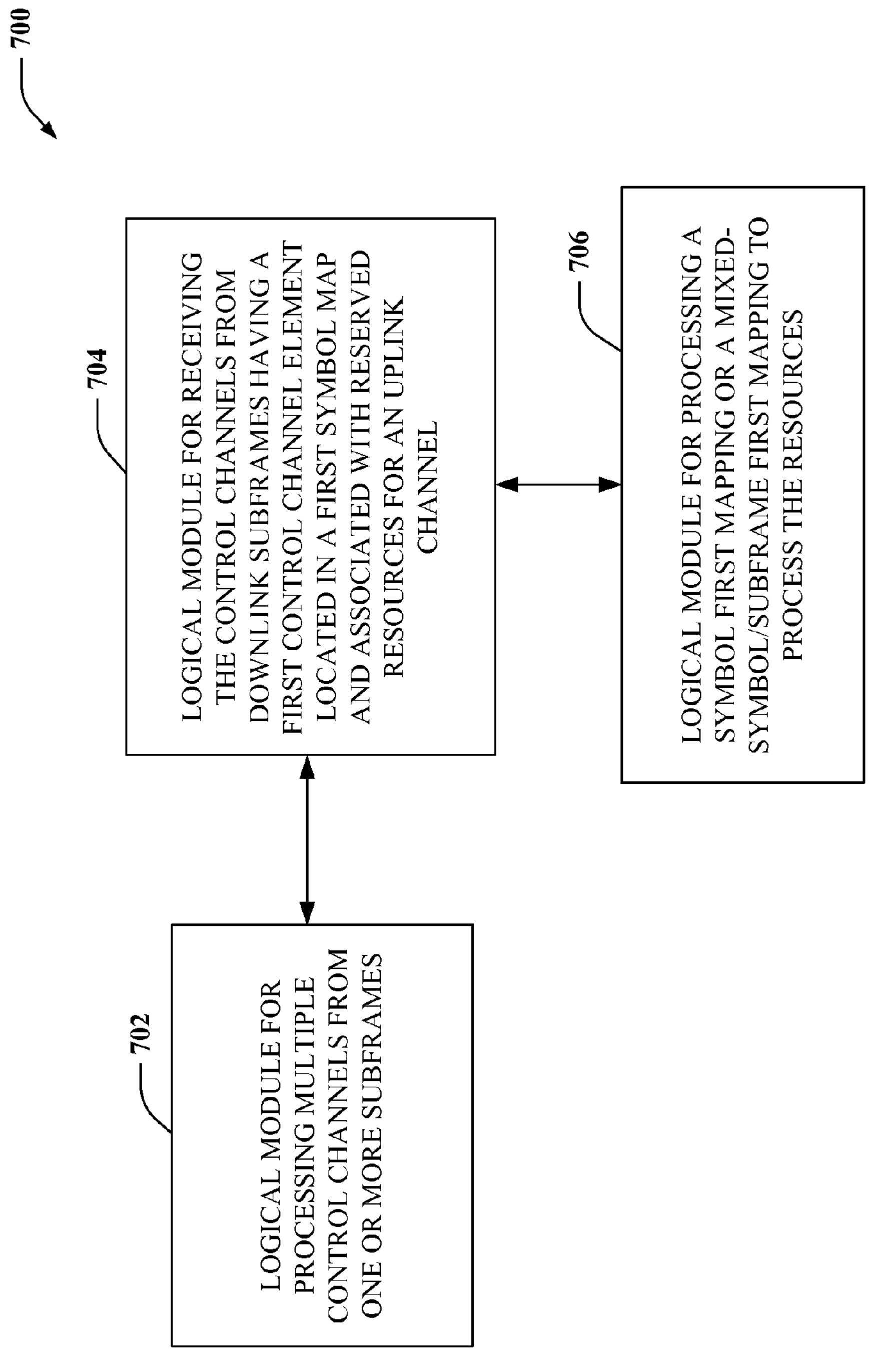
FIG. 7 illustrates an example logical module for an alternative wireless symbol mapping process.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 for processing multiple control channels from one or more subframes and a logical module 604 for sequencing the control channels across downlink subframes having a first control channel element located in a first symbol map and associated with reserved resources for an uplink channel. The system 600 also includes a logical module 606 for generating a symbol first mapping or a mixed-symbol/subframe first mapping to process the resources.

Referring to FIG. 7, a wireless communication system 700 is provided. The system 700 includes a logical module 702 for processing multiple control channels from one or more subframes and a logical module 704 for receiving the control channels from downlink subframes having a first control channel element located in a first symbol map and associated with reserved resources for an uplink channel. The system 700 also includes a logical module 706 for processing a symbol first mapping or a mixed-symbol/subframe first mapping to process the resources.

Figure 8:
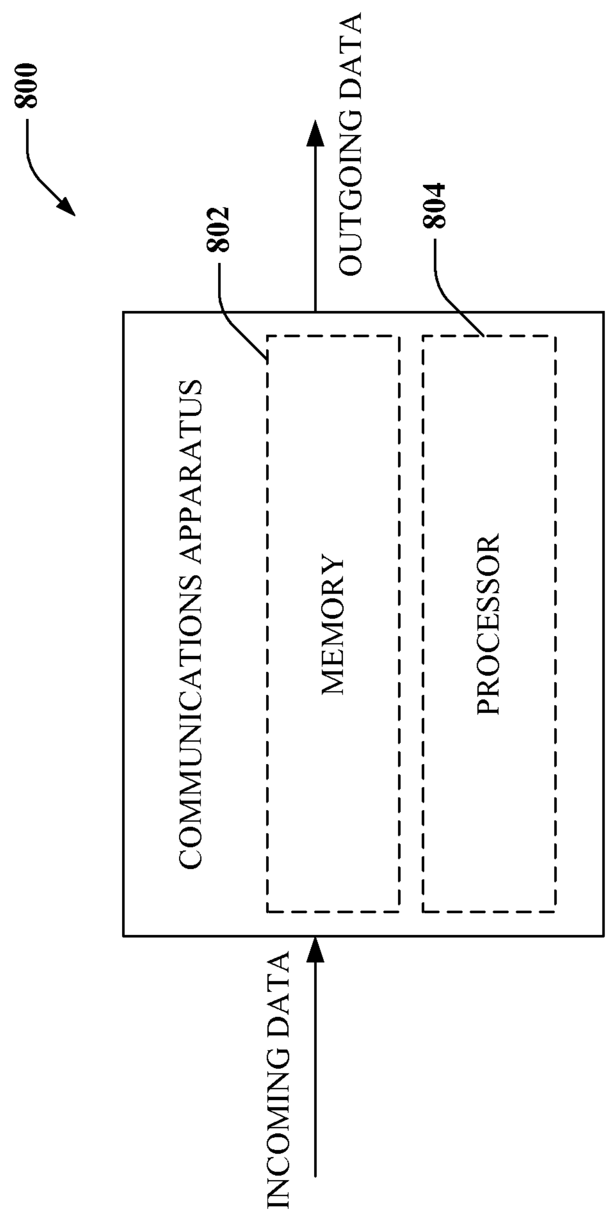
FIG. 8 illustrates an example communications apparatus that employs wireless symbol mapping.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
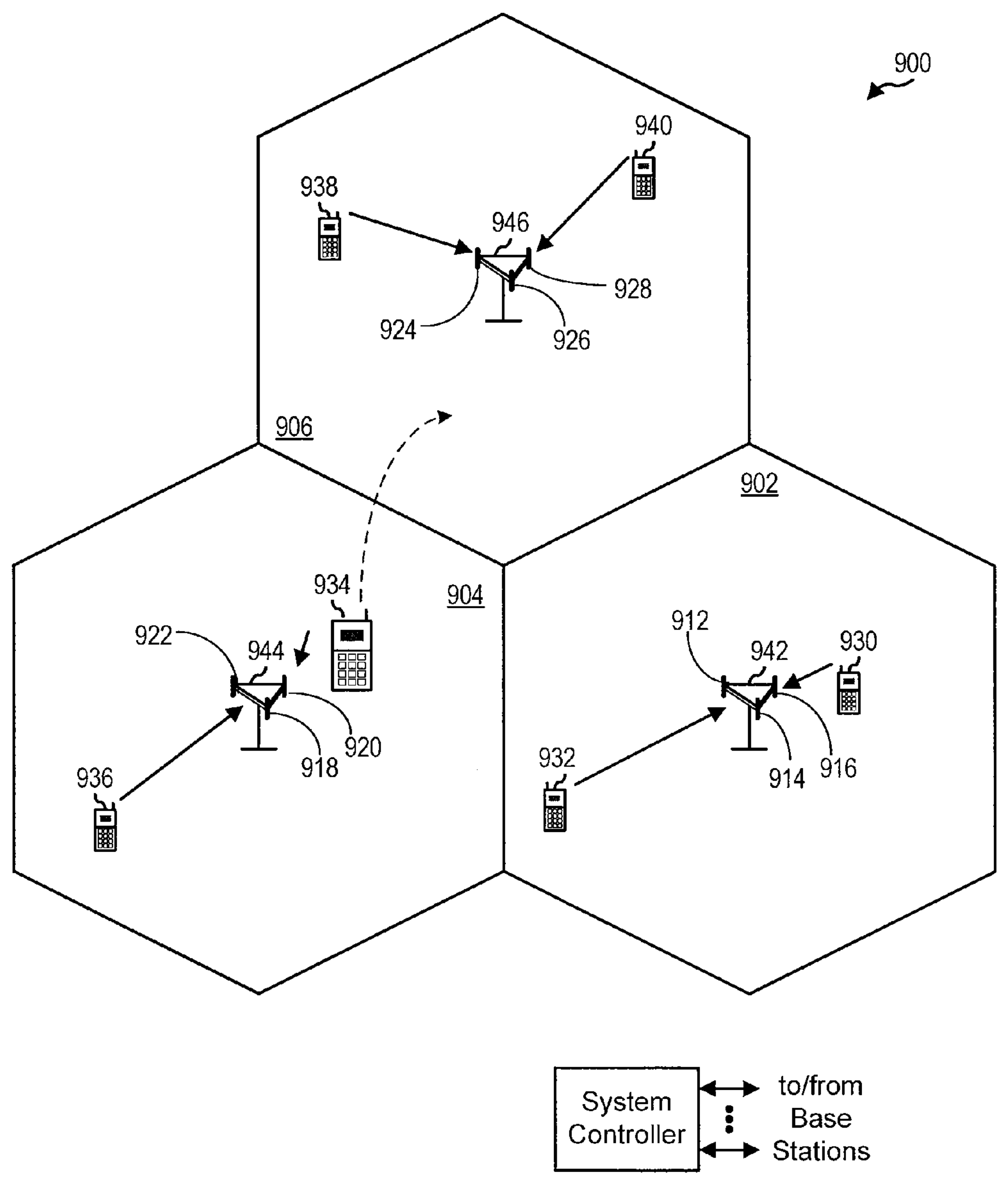
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
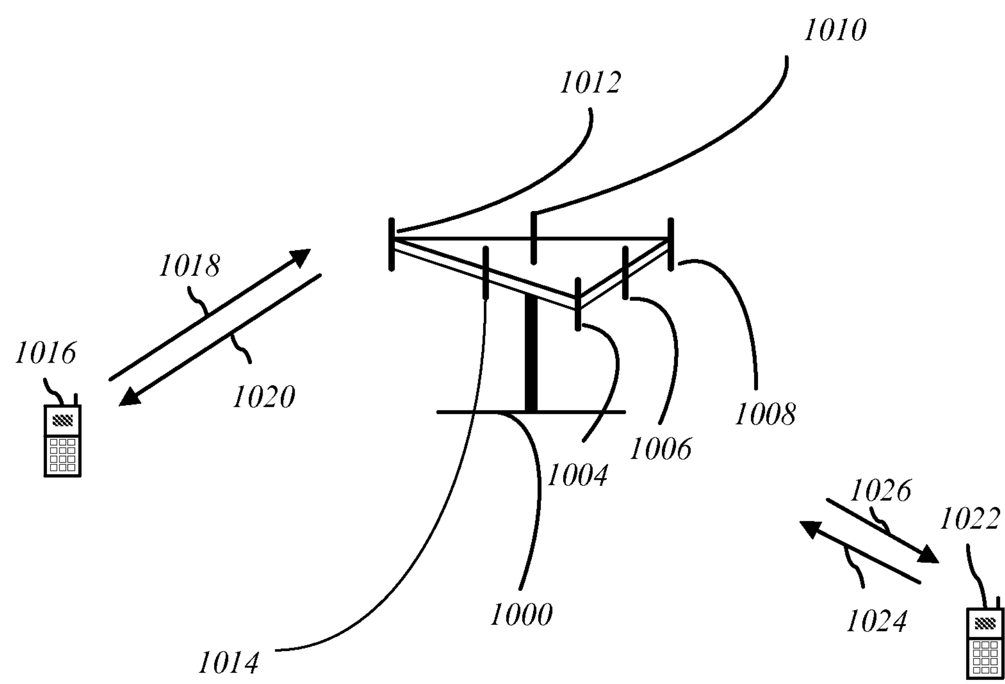
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1022. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
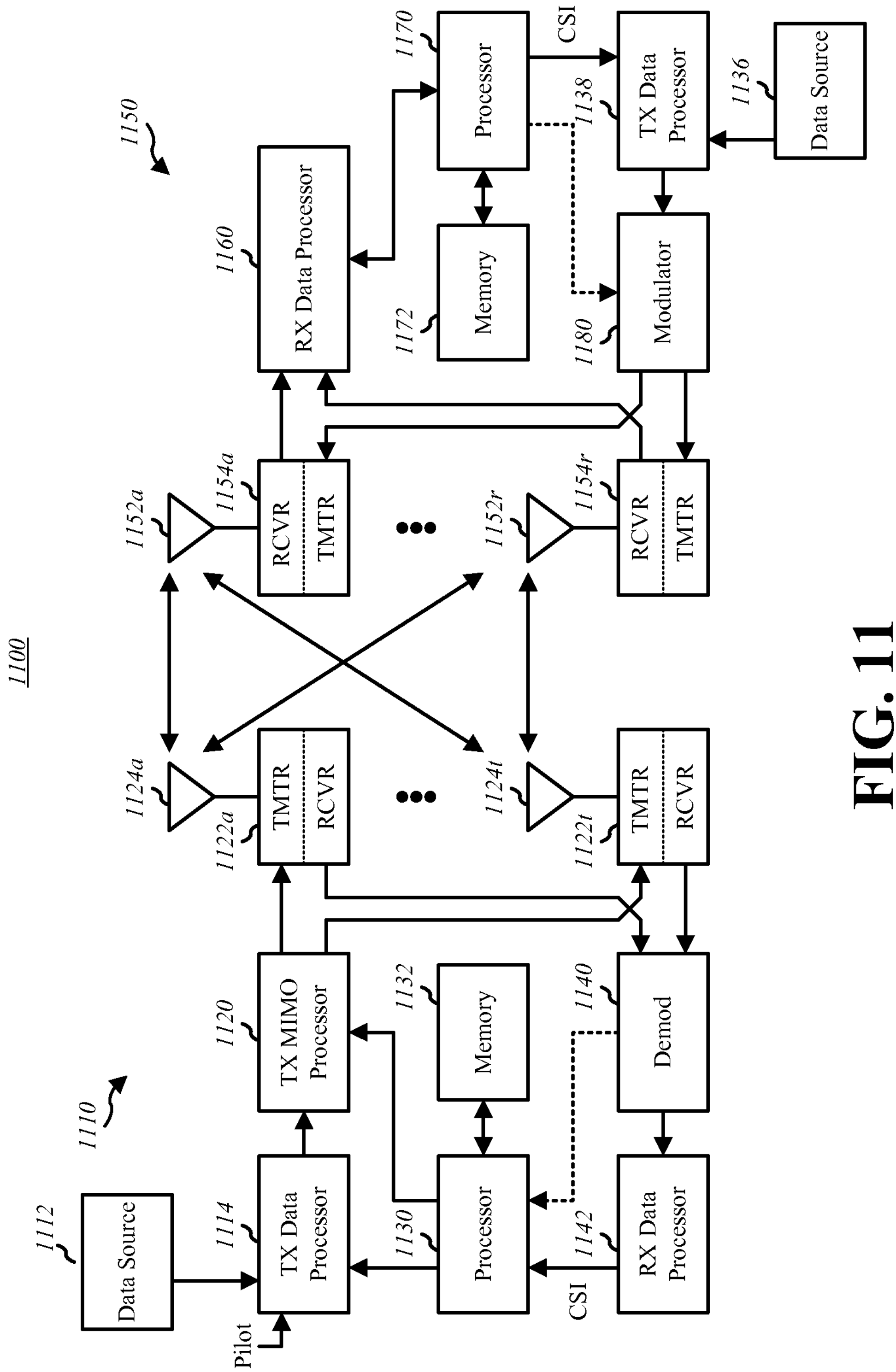

Referring to FIG. 11, a system 1100 illustrates a transmitter system 1110 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) **1122*a* through 1122*t*. In certain embodiments, TX MIMO processor 1120** applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters **1122*a* through 1122*t* are then transmitted from NT antennas 1124*a* through 1124*t***, respectively.

At receiver system 1150, the transmitted modulated signals are received by NR antennas **1152*a* through 1152*r* and the received signal from each antenna 1152 is provided to a respective receiver (RCVR) 1154*a* through 1154*r*. Each receiver 1154** conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters **1154*a* through 1154*r*, and transmitted back to transmitter system 1110**.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to allocate resources for wireless communications, comprising:

grouping downlink control channels from multiple subframes;

mapping the downlink control channels to control channel elements (CCEs), wherein the mapping comprises ordering downlink control channels of the grouped downlink control channels in an effort to locate first CCEs of multiple downlink control channels to locations that implicitly map to a first set of resources reserved for uplink (UL) dynamic acknowledgement/negative-acknowledgment (ACK/NACK) such that a second set of the resources reserved for UL dynamic ACK/NACK can be used by physical uplink shared channel (PUSCH) transmission, wherein the mapping comprises:

ordering a first one or more downlink control channels, in an effort to locate first CCEs of the first one or more downlink control channels to locations in a first subframe that implicitly map to the first set of resources; and ordering a second one or more downlink control channels, of the grouped downlink control channels, in an effort to locate first CCEs of the second one or more downlink control channels to locations in a second subframe that implicitly map to the first set of resources;

ordering downlink control channels, of the grouped downlink control channels, not associated with the first CCE in the first subframe for mapping to the first set of resources;

ordering downlink control channels, of the grouped downlink control channels, not associated with the first CCE or the first subframe, in the second subframe for mapping to the first set of resources; and transmitting the downlink control channels in accordance with the mapping.

2. The method of claim 1, the downlink control channels are associated with a physical downlink control channels (PDCCHs).

3. A communications apparatus, comprising:

a memory that retains instructions for:

grouping downlink control channels from multiple subframes;

mapping the downlink control channels to control channel elements (CCEs), wherein the mapping comprises ordering downlink control channels of the grouped downlink control channels in an effort to locate first CCEs of multiple downlink control channels to locations that implicitly map to a first set of recourses reserved for uplink (UL) dynamic acknowledgment/negative-acknowledgement (ACK/NACK) such that a second set of the resources reserved for UL dynamic ACK/NACK can be used by physical uplink shared channel (PUSCH) transmission, wherein the instructions for mapping comprise:

ordering a first one or more downlink control channels, of the grouped downlink control channels, in an effort to locate first CCEs of the first one or more downlink control channels to locations in a first subframe that implicitly map to the first set of resources; and ordering a second one or more downlink control channels, of the grouped downlink control channels, in an effort to locate first CCEs of the second one or more downlink control channels to locations in a second subframe that implicitly map to the first set of resources;

ordering downlink control channels, of the grouped downlink control channels, not associated with the first CCE in the first subframe for mapping to the first set of resources;

ordering downlink control channels, of the grouped downlink control channels, not associated with the first CCE or the first subframe, in the second subframe for mapping to the first set of resources; and transmitting the downlink control channels in accordance with the mapping; and a processor that executes the instructions.

4. A communications apparatus, comprising:

means for grouping downlink control channels from multiple subframes;

means for mapping the downlink control channels to first control channel elements (CCEs), wherein the mapping comprises ordering downlink control channels of the grouped downlink control channels in an effort to locate first CCEs of multiple downlink control channels to locations that implicitly map to a first set of resources reserved for uplink (UL) dynamic acknowledgement/negative-acknowledgment (ACK/NACK) such that a second set of the resources reserved for UL dynamic ACK/NACK can be used by physical uplink shared channel (PUSCH) transmission, wherein the means for mapping comprises:

means for ordering a first one or more downlink control channels, of the grouped downlink control channels, in an effort to locate first CCEs of the first one or more downlink control channels to locations in a first subframe that implicitly map to the first set of resources; and means for ordering a second one or more downlink control channels, of the grouped downlink control channels, in an effort to locate first CCEs of the second one or more downlink control channels to locations in a second subframe that implicitly map to the first set of resources;

mean for ordering downlink control channels, of the grouped downlink control channels, not associated with the first CCE in the first subframe for mapping to the first set of resources;

means for ordering downlink control channels, of the grouped downlink control channels, not associated with the first CCE or the first subframe, in the second subframe for mapping to the first set of resources; and means for transmitting the downlink control channels in accordance with the mapping.

5. A non-transitory computer-readable medium having instructions stored thereon, the instructions comprising code for causing at least one computer to:

group downlink control channels from multiple subframes;

map the downlink control channels across to control channel elements (CCEs), wherein the mapping comprises ordering downlink control channels of the grouped downlink control channels in an effort to locate first CCEs of multiple downlink control channels to locations that implicitly map to a first set of resources reserved for uplink (UL) dynamic acknowledgement/negative-acknowledgment (ACK/NACK) such that a second set of the resources reserved for UL dynamic ACK/NACK can be used by physical uplink shared channel (PUSCH) transmission;

wherein the mapping comprises:

ordering a first one or more downlink control channels, of the grouped downlink control channels, in an effort to locate first CCEs of the first one or more downlink control channels to locations in a first subframe that implicitly map to the first set of resources; and ordering a second one or more downlink control channels, of the grouped downlink control channels, in an effort to locate first CCEs of the second one or more downlink control channels to locations in a second subframe that implicitly map to the first set of resources;

ordering downlink control channels, of the grouped downlink control channels, not associated with the first CCE in the first subframe for mapping to the first set of resources;

ordering downlink control channels, of the grouped downlink control channels, not associated with the first CCE or the first subframe, in the second subframe for mapping to the first set of resources; and transmit the downlink control channels in accordance with the mapping.

* * * * *